United States Patent [19]

Yuto et al.

[11] Patent Number: 4,683,166
[45] Date of Patent: Jul. 28, 1987

[54] FOAMED PLASTIC INSULATED WIRE AND METHOD FOR PRODUCING SAME

[75] Inventors: Masso Yuto; Yoichi Suzuki, both of Yokohama, Japan

[73] Assignee: Sumitomo Electric Industries, Ltd., Osaka, Japan

[21] Appl. No.: 846,487

Related U.S. Application Data

[63] Continuation of Ser. No. 335,315, Dec. 29, 1981, which is a continuation of Ser. No. 970,021, Dec. 14, 1978.

[22] Filed: Apr. 1, 1986

[30] Foreign Application Priority Data

Dec. 16, 1977 [JP] Japan .................................. 52-150600

[51] Int. Cl.⁴ ............................................. B32B 3/26
[52] U.S. Cl. .............................. 428/314.8; 428/318.6; 428/318.8; 428/319.1; 428/398
[58] Field of Search ................... 174/110 F, 110 PM; 428/315.7, 314.4, 314.8, 319.1, 319.9, 375, 376, 398, 318.6, 318.8

[56] References Cited

U.S. PATENT DOCUMENTS

| | | | |
|---|---|---|---|
| 3,986,253 | 10/1976 | Harris | 428/314.4 |
| 4,049,147 | 9/1977 | Stiles et al. | 428/314.8 |
| 4,352,701 | 10/1982 | Shimba et al. | 156/51 |
| 4,547,328 | 10/1985 | Yuto et al. | 521/79 |

FOREIGN PATENT DOCUMENTS 1595106 8/1981 United Kingdom ............ 428/314.4

OTHER PUBLICATIONS

"Plastic Foaming Mold Handbook", Japan (Oct. 8, 1968), p. 155.
Proceedings of 21st International Wire and Cable Symposium, Atlantic City, N.J., Dec. 5-7, 1972, pp. 173-181.

*Primary Examiner*—William J. Van Balen
*Attorney, Agent, or Firm*—Sughrue, Mion, Zinn, Macpeak, and Seas

[57] ABSTRACT

A foamed plastic insulated wire having a foamed plastic material insulation layer formed over a conductor. The plastic material includes at least one component having a swelling ratio greater than 55%, and the component comprises at least 20% by weight of the insulation layer. The insulated wire is produced by adding a blowing agent such as a chemical blowing agent and an inert gas and extruding the mixture over a conductor.

6 Claims, 2 Drawing Figures

FOAMED PLASTIC INSULATED WIRE AND METHOD FOR PRODUCING SAME

This is a continuation of application Ser. No. 06/335,315, filed Dec. 29, 1981 which is a continuation of application Ser. No. 05/970,021 filed Dec. 14, 1978 both now abandoned.

BACKGROUND OF THE INVENTION

This invention relates to a foamed plastic insulated wire and a method for producing the same. More particularly, this invention relates to a type of foamed plastic insulated wire which exhibits high electrical characteristics and high mechanical strength while providing a high degree of expansion in the insulation material. This invention also relates to a method for producing such a foamed plastic insulated wire.

In the field of communication cables, conductors formed with a foamed plastic insulation are widely used. Particularly, foamed polyolefin is commonly used as an insulation layer. Normally, in these cables, the degree of expansion of the foamed plastic insulator is in a wide range for example 10% to 90% under measurement by a specific gravity method.

Generally, foamed plastic insulation is obtained by extrusion method by means of a screw extruder. A chemical blowing agent such as azodicarbonamide, and 4,4'-oxybis(benzenesulfonylhydrazide), or inert gas such as nitrogen, argon, and carbonic acid gases, or gaseous or liquid hydrocarbon of methane, propane, butane, pentane, and hexane, or gaseous or liquidized fluorocarbon such as trichloromonofluoromethane, dichlorodifluoromethan, trichlorotrifluoroethane, and dichlorotetrafluoroethane is usually employed. The plastic material is generally polyolefin such as low density polyethylene, medium density polyethylene, high density polyethylene, polypropylene, and butyl rubber or the mixture of at least two of these materials. Polyethylene and polypropylene are the most ordinary materials used as plastic materials.

A foamed plastic insulator having expansion degree of 20 to 30% is easily produced by using chemical blowing agents or inert gas and any of the plastic materials mentioned above. However, recently, foamed plastic insulators having a high expansion degree such as 50% or more have required in order to enhance electric characteristics and to reduce diameter of the cable. Applicant's various experiments and analysis reveal that elasticity of the plastic materials is the most important factor to obtain a high degree of expansion. Therefore, the swelling ratio which is the index of elasticity of the plastic material is found to be the determinative factor to obtain high degrees of expansion of the insulator.

In order to meet with the above requirement, the applicant has proposed methods for producing foamed plastic insulation having an expansion ratio of 67% or more by using hydrocarbon or fluorocarbon as a blowing agent and plastic materials whose swelling ratio is in a range of 40 to 75%. This is disclosed in Japanese patent application No. 140755/76, now open OPI No. SHO-53-73382. However, other kinds of high foamed plastic insulation formed over a conductor and methods for producing such insulation are still required to fulfill wide ranging requirements. Also, in many applications the use of hydrocarbon or fluorocarbon as the blowing agent is unacceptable. Furthermore in this prior art example nucleating agents must be used.

SUMMARY OF THE INVENTION

It is therefore an object of this invention to provide an improved foamed plastic insulated wire exhibiting excellent characteristics in high expansion ratio.

It is another object of this invention to provide a method for producing such a foamed plastic insulator wire which can be used for example in a cable.

Still another object of this is to provide a foamed plastic insulated wire formed without the use of hydro or fluorocarbon or nucleating agents.

The objects are attained, in accordance with the present invention by using plastic materials having a swelling ratio of 55% or more even with the employment of chemical blowing agent such as azodicarbonamide and 4,4'-oxybis(bensenesulfonylhydrazide) and/or inert gas such as nitrogen, argon and carbonic acid gases. The present invention employs plastic materials such as low density polyethylene, medium density polyethylene, high density polyethylene and polypropylene, and butyl rubber or a mixture of at least two materials among that group. The mixture should include 20 wt% or more plastic whose melt flow swelling ratio is 55% or more. Furthermore, according to the present invention, in order to enhance dimensional stability and mechanical strength of the cable as well as to enhance degree of expansion of the foamed plastic insulator, a solid layer is simultaneously extruded over the outer peripheral surface of the foamed plastic insulation layer extruded over the conductor. Since the solid layer has a higher mechanical strength and thermal conductivity than that the foamed plastic layer, the solid layer is immediately cooled to harden the surface. This increases the mechanical strength and ensures dimensional stability. Additionally, since gas or bubbles in the foamed layer is confined in the solid layer, the degree of expansion is further enhanced.

This invention will be explained in detail by the accompanying drawings and the description of the preferred embodiment that follows.

DETAILED DESCRIPTION OF THE INVENTION

The melt flow swelling ratio referred to above is calculated by the following equation:

$$SR(\%) = \frac{d_s - d_o}{d_o} \times 100$$

where: $d_s$ is an outer diameter of the extruded material and, $d_o$ is an inner diameter of an orifice provided in an extrusion plastometer defined by JIS K 6760 or ASTM D 1238-70. $d_s$ and $d_o$ are obtained when measuring melt index MI by the extrusion plastometer. Both $d_s$ and $d_o$ are measured at room temperature. The condition of measurement of the melt index is shown in Table 1.

TABLE 1

| resin | temperature | load (gram) |
| --- | --- | --- |
| low density polyethylene (LDPE) | 190° C. | 2160 |
| high density polyethylene (HDPE) | 190° C. | 2160 |
| polypropylene (PPr) | 230° C. | 2160 |

Furthermore, degree of expansion described above is calculated by the following equation:

$$\text{degree of expansion } (\%) = (\rho_0 - \rho/\rho_0) \times 100$$

where $\rho_0$ is a density of the resin before expansion, and $\rho$ is a density of the resin after expansion.

According to the present invention, in case of employment of a chemical blowing agent and an inert gas blowing agent, insulated conductor formed with high foamable materials having expansion degree of 55% or more is easily obtained by using plastic materials having a melt flow swelling ratio of 55% or more while exhibiting excellent characteristics.

The chemical blowing agent used in this invention is selected from azodicarbonamide and 4,4'-oxybis(bensenesulfonylhydrazide), and the inert gas blowing agent used in this invention is selected from nitrogen, argon, and carbonic acid gases. The plastic material used in this invention is selected from high density polyethylene, medium density polyethylene, low density polyethylene, polypropylene and butyl rubber, or the mixture of at least two materials. The mixture includes 20% by weight of resin or more, which has a melt flow swelling ratio of 55% or more.

Furthermore, in order to improve mechanical strength and dimensional stability of the cable, the foamed insulation layer is preferably coated with a solid layer by extruding the same simultaneously with the extrusion of the insulation layer.

Figure 1:
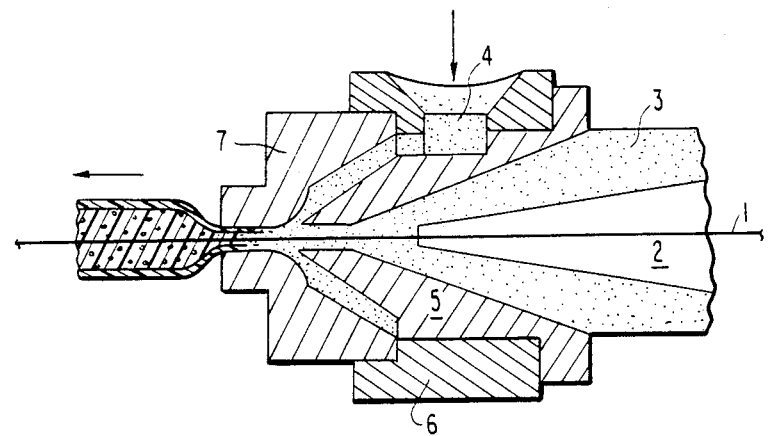
FIG. 1 is a cross-sectional illustration of a device for producing a cable according to the present invention.
Figure 2:
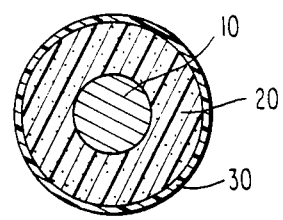
FIG. 2 is a cross-sectional view of one example of a cable according to the present invention.

As shown in FIG. 1, a conductor 1 passing through a nipple 2 is coated with a foamed plastic material 3 such as polyolefin by an extrusion coating by means of a first die 5. A non-foamed material 4 is extrusion coated over the foamed plastic material 3 by means of a second die 7. The dies 5 and 7 are coaxially supported by a die holder 6 to thereby obtain a cable comprising a conductor 10, foamed insulation layer 20 and solid layer 30. This is shown in the end sectional view, FIG. 2.

According to this method, since foamed and non-foamed materials are in a molten state, these two are completely fixed with each other to thereby enhance mechanical strength. The materials to be used in the solid layer is polyolefin such as polyethlene and polypropylene in order to obtain thermal bonding to the internal foamed polyolefin. By providing such a solid layer, the mechanical strength and dimensional stability of the cable is improved. That is, since the solid layer has a higher mechanical and thermal conductivity than that of the foamed plastic layer, the solid layer is immediately cooled to harden the same, to thereby increase mechanical strength and ensure dimensional stability. Further, since gas or bubbles in the foamed layer is confined within the solid layer, the degree of expansion of the foamed layer is further enhanced. If the solid layer is not provided over the foamable layer, the foamed insulation may be deflated due to the escape of the gas therefrom, or may be deformed during cooling, or deformed into elliptical shape in cross section by rollers during its travel to a take-up device.

The present invention will be more easily understood with reference to the Examples described below.

EXAMPLE 1

By weight of 1.5% of azodicarbonamide was added as a blowing agent to the resin shown in Table 2 to produce a cable having conductor diameter of 0.65 mm and insulation diameter of 1.8 mm, and the expansion degree and characteristic of each cables were tested.

TABLE 2

| No. | resin | SR (%) | expansion degree (%) | cell size (μ) | insulation bonding to conductor | appearance |
| --- | --- | --- | --- | --- | --- | --- |
| 1. | LDPE | 24.3 | 48.0 | 100 to 200 | good | good |
| 2. | LDPE | 29.3 | 59.7 | 200 or more | bad | bad |
| 3. | LDPE | 42.4 | 52.0 | 100 to 200 | bad | bad |
| 4. | LDPE | 52.8 | 54.0 | 200 or more | bad | bad |
| 5. | LDPE | 56.0 | 60.8 | 50 or less | good | good |
| 6. | LDPE | 67.2 | 65.4 | 50 or less | good | good |
| 7. | LDPE | 72.6 | 69.7 | 50 or less | good | good |

EXAMPLE 2

0.5% by weight of azodicarbonamide was added as a blowing agent to the resin materials shown in Table 3. Further 350 cc/min of nitrogen gas was injected in the extruder to produce foamed plastic insulated wire having conductor diameter of 0.4 mm and insulation diameter of 1.55 mm. The expansion degree and characteristics are shown in Table 3.

TABLE 3

| No. | resin mixture | expansion degree (%) | cell diameter (μ) | insulation bonding to conductor | appearance |
| --- | --- | --- | --- | --- | --- |
| 1. | LDPE (15%) PPr (85%) | 51.0 | 100 to 200 | bad | bad |
| 2. | LDPE (20%) PPr (80%) | 60.0 | 50 or less | good | good |
| 3. | LDPE (40%) PPr (60%) | 64.8 | 50 or less | good | good |
| 4. | LDPE (80%) PPr (20%) | 66.2 | 50 or less | good | good |
| 5. | LDPE (15%) HDPE (40%) PPr (45%) | 49.8 | 200 or more | bad | bad |
| 6. | LDPE (20%) HDPE (40%) PPr (40%) | 63.3 | 50 or less | good | good |

SR the resin used is as follows.
LDPE (low density polyethylene) 67.2%
HDPE (high density polyethylene) 45.0%
PPr (polypropylene) 21.2%

EXAMPLE 3

2% by weight of silica was added as blowing agent to a resin or resin mixture shown in Table 4, and 500 cc/min of nitrogen gas was injected into the extruder to produce foamed plastic insulated wire having a conductor diameter of 0.65 mm and insulation diameter of 1.60 mm. The expansion degree and characteristics are shown in Table 4.

TABLE 4

| No. | resin or resin mixture | SR (%) | expansion degree (%) | cell size (μ) | insulation bonding to conductor | appearance |
|---|---|---|---|---|---|---|
| 1. | LDPE | 24.3 | 62.2 | 200 or more | bad | bad |
| 2. | LDPE | 42.4 | 44.0 | 100 to 200 | bad | bad |
| 3. | LDPE | 56.0 | 61.5 | 50 or less | good | good |
| 4. | LDPE | 67.2 | 67.0 | 50 or less | good | good |
| 5. | LDPE (10%) PPr (90%) | 67.2 28.0 | 56.0 | 100 to 200 | bad | bad |
| 6. | LDPE (20%) PPr (80%) | 67.2 28.0 | 66.0 | 50 or less | good | good |

As is evident from these examples, in case of the employment of the chemical blowing agent and/or inert gas blowing agent, a conductor formed with high foamable plastic insulation having excellent characteristics is obtainable at the degree of expansion of 55% or more by using plastic material having a melt flow swelling ratio of 55% or more. In case of the employment of the resin mixture, the mixture including 20% by weight of resin or more whose swelling ratio is 55% or more exhibits excellent characteristics.

Further, it is possible to apply the present invention for the production of low foamable plastic insulation having expansion degree of 55% or less. In this case, the use of the plastic materials having a melt flow swelling ratio of 55% or more reduces the amount of blowing agent in comparison with the use of the plastic materials other than in the present invention. This results in foamed plastic insulated wire having high quality which avoids degradation of electric characteristic and extrusion efficiency due to residue by decomposition of blowing agent.

EXAMPLE 4

An extruder was prepared in which inner diameter of cylinders of 65 mm and 32 mm were provided to produce a high foamable layer and a solid layer, respectively by a crosshead shown in FIG. 1. The diameter of a conductor was 0.7 mm the obtained thickness of high foamable insulation layer was 1.10 mm and the obtained thickness of the solid layer formed over the foamed layer was 0.1 mm. In case of the comparative samples shown in Table 5, the thickness of high foamable layer was 1.20 mm. The blowing agent used was azodicarbonamide. The resin used was the mixture of 80% by weight of low density polyethylene having swelling ratio of 67% and 20% by weight of polypropylene having swelling ratio of 21% and the solid layer used is shown in Table 5.

TABLE 5

| solid layer | sample 1 polypropylene | sample 2 polyethylene low density | sample 3 polyethylene high density | comparative sample 1 | comparative sample 2 plasticized PVC |
|---|---|---|---|---|---|
| dielectric constant | 1.40 | 1.40 | 1.40 | 1.40 | 1.60 |
| *ellipse degree (mm) | 0.05 | 0.10 | 0.05 | 0.30 | 0.30 |

*ellipse degree = major diameter − minor diameter

These examples prove that the high foamable plastic insulated wires coated with the solid layer exhibits superior results to that not coated with a solid layer in terms of dielectric constant and ellipse degree.

EXAMPLE 5

High foamable polyethylene insulated wire used in sample 3 was formed with braided copper wires as an outer conductor and PVC sheath was formed over the outer conductor to thus produce a coaxial cable having foamed insulation whose outer diameter was approximately 3 mm. Shown in Table 6 are the standards of an ordinary coaxial cable commercially available having an insulation diameter of approximately 3 mm to compare the characteristics of the coaxial cable thus produced.

TABLE 6

|  | capacitance C (pF/m) | characteristic impedance $Z_0$ (Ω) |
|---|---|---|
| characteristic according to the present invention. | 54.0 | 74.8 |
| standardized characteristic | 54.0 ± 2 | 75.0 ± 3 |

*these were measured at frequency of 10 MHz.

According to Table 6, it is found that the characteristics obtained by the present invention is within the standardized characteristic, and therefore, the coaxial cable of this invention is commercially acceptable.

EXAMPLE 6

Dichlorotetrafluoroethane was added as a blowing agent to the resin or resin mixture shown in Table 7. The same extruder and a cross head as those used in Example 5 were used to produce cables having conductor diameter of 1.20 mm, high foamable layer, the thickness of which was 1.70 mm, and a solid layer, made of polyolefin, the thickness of which was 0.20 mm. In comparative samples 1 and 2, the thickness of the high foamable layer was 1.90 mm, because of no provision of the solid layer.

TABLE 7

| No. | solid layer | foamed layer | dielectric constant of insulation layer | ellipse degree |
|---|---|---|---|---|
| 1. | — | LDPE (SR = 67%) | 1.30 | 0.70 |
| 2. | HDPE | LDPE (SR = 67%) | 1.30 | 0.10 |
| comparative sample 1. | — | 40 wt % of LDPE (SR = 67%) | 1.32 | 0.50 |
| comparative sample 2. | LDPE | 60 wt % of HDPE (SR = 15%) | 1.32 | 0.08 |

We claim:

1. A foamed plastic insulated wire comprising a foamed plastic material insulation layer formed over a conductor, said plastic material consisting essentially of a foamed low density polyethylene made from (a) a foamable low density polyethylene having a melt flow swelling ratio greater than 55%, and (b) a chemical blowing agent, an inert gas blowing agent, or a combination thereof, said foamed low density polyethylene comprising at least 20% by weight of said insulation layer, and having a cell size of 50 microns or less.

2. A foamed plastic insulated wire as defined in claim 1, further comprising a solid layer formed over said insulation layer, said solid layer consisting essentially of polyolefin.

3. A foamed plastic insulated wire as defined in claim 2, wherein said polyolefin is polyethylene.

4. A foamed plastic insulated wire as defined in claim 2, wherein said polyolefin is polypropylene.

5. A foamed plastic insulated wire according to claim 1, wherein the foamed plastic material has an expansion degree of at least 60%.

6. A foamed plastic insulated wire according to claim 1, wherein the foamed plastic material has an expansion degree of at least 55%.

* * * * *